Oct. 28, 1941.   J. D. MERRIFIELD   2,260,719
ROUND BELT CONSTRUCTION
Filed July 19, 1940
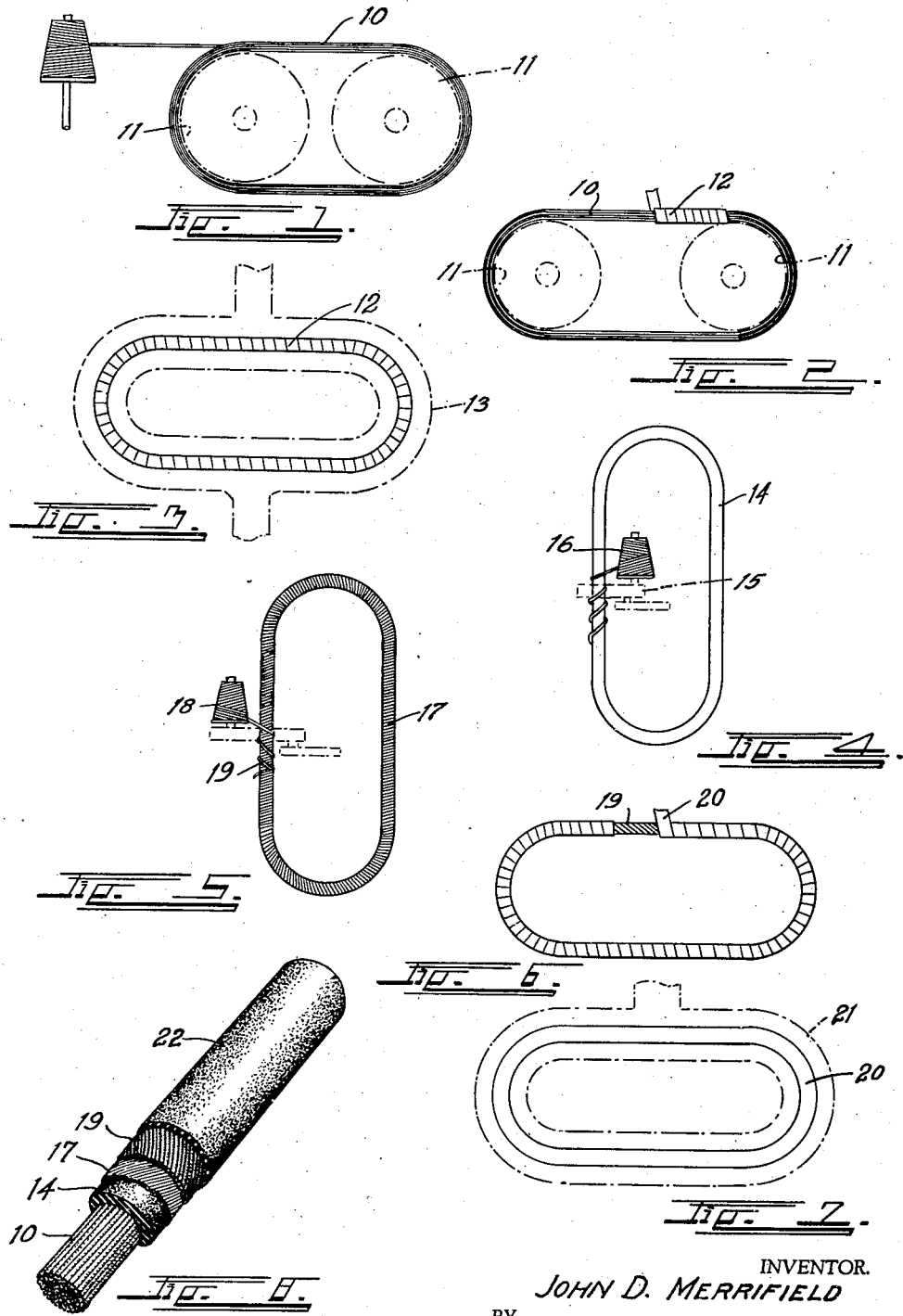
INVENTOR.
JOHN D. MERRIFIELD
BY Patented Oct. 28, 1941

2,260,719

UNITED STATES PATENT OFFICE 2,260,719

ROUND BELT CONSTRUCTION

John D. Merrifield, Rocky Ford, Colo.

Application July 19, 1940, Serial No. 346,358

8 Claims. (Cl. 57—141)

This invention relates to a power transmission belt. There are occasions in the transmission of power between two shafts that the shafts are not parallel to each other so that the belt is required, in addition to traveling around the belt pulleys, to make an angular turn between the two shafts. In many cases, this turn reaches 90° and, where it is desired to reverse the rotation of a belt driven shaft, the belt must turn through 180°. There are also occasions where a belt is required during the course of its length to encounter intermediate pulleys engaging it from various angles.

None of the above conditions can be efficiently met with the usual V-belt construction and the efficiency of flat belts is not satisfactory.

The principal object of this invention is to provide a belt for such uses, which will have the efficiency of a V-belt and yet can meet any of the above noted conditions.

Other objects of the invention are to provide a non-stretching belt which will be exceedingly strong for its size and exceedingly long wearing and to provide an economical and efficient process for manufacturing such a belt.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Figs. 1 to 7 are diagrammatic views illustrating the successive steps in the manufacture of the improved belt.

Fig. 8 is a fragmentary perspective view illustrating the completed construction of the improved belt.

The improved belt is always manufactured in an endless condition and in sizes and lengths to suit various pulley spacings, diameters, and sizes. The belt will be better understood from a description of the process involved in the manufacture of the same. The process consists of a series of steps, as illustrated in Figs. 1 to 7.

The first step is to wind a single tension cord into a plurality of layers or strands to build up a tension cord core 10 of sufficient strength to sustain the tension to be placed upon the finished belt. While at any section the core appears to be formed from a plurality of cords, it is actually but a single cord wound in continuous turns over either a single mandrel pulley or preferably over a pair of mandrel pulleys, such as indicated in broken line at 11, Fig. 1. The tension core is impregnated with latex or similar resilient, friction-resisting, water-proof material.

The tension core is then wound or otherwise coated with raw rubber, as indicated at 12, in Fig. 2, and placed in a suitable vulcanizer, such as indicated in broken line at 13, Fig. 3, by means of which the raw rubber is cured into a rubber cushion tube 14 surrounding the tension core 10.

The endless tube with its tension core is then placed in any suitable winding machine, such as indicated in broken line at 15, Fig. 4, which carries a spool of relatively light, strong, impregnated cord 16. The spool whirls around the tube 14 and winds a spaced-apart spiral of cord thereon. On the second turn it continues to wind the same cord alongside the first spiral winding until the entire tube 14 is enclosed in a first closed cord layer 17 consisting of a single continuous cord.

The belt with its winding 17 is now subjected to a second winding from a spool of relatively heavy, latex impregnated cord 18 which is wound thereon in a similar manner to the first cord but in an opposite direction therefrom, as shown in Fig. 5, to provide a friction cord layer 19, in which the cord lies substantially at right angles to the cord of the first layer 17.

The entire belt is now subjected to an outer winding or wrapping of raw, tough, tread-stock rubber, as indicated at 20 in Fig. 6, and is then placed within a suitable vulcanizer, such as indicated at 21 in Fig. 7, to produce a finished cured rubber cover 22 on the belt.

It is desired to call attention to the fact that although the cord layers 10, 17, and 19 appear to be a plurality of cords, each consists of but a single cord so that, to form the entire belt, only three continuous cords are employed wound into a plurality of windings, thus all joints, splices, or weak spots are entirely eliminated and the belt is of uniform strength throughout.

At the time of the first vulcanizing (Fig. 3) considerable pressure is employed, so that the raw rubber at the time of fluidity is forced into and among the windings of the tension cord core 10 to provide a resilient friction cushion between the layers of cord. This also occurs at the time of final vulcanization of Fig. 7, in which the raw rubber winding of Fig. 6 is forced under pressure into and between the cord turns of the cord layers 17 and 19.

The result of the above is a round endless, flexible belt of exceedingly great strength and wearing qualities. The pulley wear on the belt is received in the main by the heavy cord layer 19 and its tough, wear-resisting rubber tube 22. This heavy cord resists great wear and even should it become worn through or broken at points, it has little or no effect on the strength of the belt since the entire tension thereon is taken by the inner cord core 10.

Since the belt is round it can be turned in any direction between pulleys without interfering with its efficiency or life. It constantly rotates during its travel to present its entire outer circumferential area to the wear of the pulleys.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A power transmission belt comprising: a solid inner core consisting of a plurality of longitudinally extending parallel cord windings; a resilient cushion tube surrounding the inner core; a first cord winding extending spirally about the cushion tube; and a second cord winding extending spirally around the first cord winding and at a lateral angle to the latter.

2. A power transmission belt comprising: a single tension cord wound in a plurality of turns to form an endless tension member; an enclosing tube of water-proof material surrounding said tension member; and a plurality of spirally wound cord layers surrounding said tube.

3. A power transmission belt comprising: a single tension cord wound in a plurality of turns to form an endless tension member; an enclosing tube of water-proof material surrounding said tension member; a first layer of cord wound about said tube in one direction; and a second layer of cord wound about the first layer in another direction.

4. A power transmission belt comprising: a single tension cord wound in a plurality of turns to form an endless tension member; an enclosing tube of water-proof material surrounding said tension member; a first layer of cord wound about said tube in one direction; a second layer of cord wound about the first layer in another direction; and an outer casing of rubber covering the second layer.

5. A power transmission belt comprising: a single tension cord wound in a plurality of turns to form an endless tension member; an enclosing tube of water-proof material surrounding said tension member; a first layer of cord wound about said tube in one direction; and a second layer of cord wound about the first layer in another direction, the cord in the second layer being relatively heavier than the cord in the inner layer.

6. A power transmission belt comprising: a single tension cord wound in a plurality of turns to form an endless tension member; an enclosing tube of water-proof material surrounding said tension member; a first layer of cord wound about said tube in one direction; and a second layer of cord wound about the first layer in another direction, each layer consisting of single cord wound in a plurality of turns.

7. A process of manufacturing an endless belt comprising: winding a cord in a series of parallel turns to form an endless tension member; enclosing said member in rubber; winding a second cord spirally about the rubber closure to form a spiral cord layer thereabout; and winding a third cord spirally about the second cord in an opposite direction thereto to form a second cord layer.

8. A process of manufacturing an endless belt comprising: winding a cord in a series of parallel turns to form an endless tension member; enclosing said member in rubber; winding a second cord spirally about the rubber closure to form a spiral cord layer thereabout; winding a third cord spirally about the second cord in an opposite direction thereto to form a second cord layer; covering the second cord layer with rubber; and then vulcanizing the entire belt to cure the rubber therein.

JOHN D. MERRIFIELD.